United States Patent Office 3,810,766
Patented May 14, 1974

3,810,766
METHOD OF EXTRACTING ROASTED COFFEE
Irving Holzberg, Spring Valley, N.Y., assignor to General Foods Corporation, White Plains, N.Y.
No Drawing. Filed Apr. 3, 1972, Ser. No. 240,776
Int. Cl. A23f 1/08
U.S. Cl. 426—386
7 Claims

ABSTRACT OF THE DISCLOSURE

In a split-extraction percolation process a technique has been discovered to significantly increase the solids concentration of the secondary extract stream. A portion of the secondary extract stream is used as a feed stream to the most spent stage, followed by a heated water feed stream. In this manner, the solids content in the secondary extract stream can be increased more than 50% as compared to standard split extraction techniques.

BACKGROUND OF THE INVENTION

This invention concerns the extraction of roasted coffee. More particularly it pertains to an improved method of split-extraction percolation.

Percolation is a method of extracting soluble solids from roasted and ground coffee in a percolator set which consists of extraction columns (typically from 5 to 8 extraction columns in a percolator set) connected by appropriate manifolding to permit countercurrent, batch-continuous operation. Fresh roasted and ground coffee is charged into an extraction column (fresh stage extraction column) and is contacted with an aqueous extraction liquor from the extraction column containing the next freshest batch of roasted and ground coffee (second stage). A predetermined weight of coffee extract is drawn-off from the fresh stage extraction column to complete a cycle and the fresh stage extraction column then becomes the second stage for the next cycle. The aqueous extraction liquor is pumped into the extraction column containing the most extracted roasted and ground coffee (spent stage extraction column) and passes progressively through the extraction columns of the percolator set from the spent stage extraction column through the fresh stage extraction column. Each cycle (from draw-off to draw-off) the coffee in the spent stage extraction column is discarded and the extraction column is loaded with fresh roasted and ground coffee to become the next fresh stage extraction column. The feed of aqueous extraction liquor is transferred to the extraction column containing the next most extracted coffee which then becomes the new spent stage extraction column. In this manner the aqueous extraction liquor is continuously fed countercurrent to the flow of the fresh roasted and ground coffee. The coffee proceeds through the system as batches within the extraction columns. Note that in percolation as thus described there is one feed stream of an aqueous extraction liquor and one draw-off stream of coffee extract. The aqueous extraction medium which may be water or a solution of salts or coffee solids in water is generally heated to about 300° F. to 400° F. before it is fed into the spent stage extraction column and the temperature of the extract decreases as it flows through successive extraction columns. It is general practice to cool the aqueous extraction liquor before it enters the fresh stage extraction column in order to draw-off a coffee extract at less than 210° F.

Split-extraction percolation is a method of extracting soluble solids from a percolator set wherein two feed streams of an aqueous extraction liquor and two draw-offs of coffee extract are used. The percolator set is essentially divided into two parts, an atmospheric section and an autoclave section. The atmospheric section typically contains from one to four extraction columns containing the least extracted roasted coffee and the autoclave section typically contains from two to five extraction columns containing the most extracted roasted coffee. The roasted and ground coffee flows in batches through the percolator set from the fresh stage extraction column through the spent stage extraction column as in ordinary percolation.

An atmospheric aqueous extraction liquor is fed into the extraction column in the atmospheric section of the split-extraction percolator set containing the most extracted roasted coffee and flows through that section of the percolator set countercurrent to the flow of fresh roasted and ground coffee. The coffee extract drawn-off from the fresh stage is now called fresh stage coffee extract and contains the more aromatic and flavorful coffee solids extracted from roasted coffee.

An autoclave aqueous extraction medium is fed into the spent stage extraction column in the autoclave section of the split extraction percolation set and a secondary coffee extract is drawn off from the extraction column in this section containing the least extracted roasted and ground coffee. In the autoclave section the temperatures and pressures within the extraction columns are significantly higher than in the atmospheric section of the split-extraction percolation set and the coffee solids in the secondary coffee extract are largely autoclaved solids, whereas the solids in the fresh stage coffee extract are largely atmospherically soluble coffee solids.

Roasted and ground coffee as used in this application refers equally to decaffeinated or undecaffeinated coffee and can be a single variety of coffee or a blend of several varieties of coffee. The blending of varieties can be done either before roasting, or after roasting but before grinding, or after roasting and grinding of individual varieties of coffee.

A major problem encountered in split-extraction percolation is that the solids concentration in the secondary extract is extremely low. This is especially true as it is usually necessary to take a large draw-off from the autoclave section in order to obtain a reasonable yield of autoclaved solids. Typical draw-off factors (D.O.F.), e.g., the ratio of extract drawn off to the weight of roasted and ground coffee charged into the fresh stage extraction column, may vary from 3.0 to 5.0.

SUMMARY OF THE INVENTION

It has now been discovered that the solids concentration of the secondary extract can be significantly increased by recycling a portion of the secondary coffee extract through the autoclave section of a split-extraction percolation set. The technique has the effect of refluxing extract through the autoclave section and increases the concentration of solids in the secondary extract drawn off as product.

In effect, two autoclave aqueous extraction liquors are used successively in the autoclave section during each cycle. The initial autoclave aqueous extraction liquor fed to the spent stage extraction column is a portion of the secondary extract. This is followed by feeding heated water (which by definition may contain dissolved salts) into the spent stage extraction column as the second successive autoclave aqueous extraction liquor.

Thus, the secondary extract is split into two parts. A portion, preferably from 40 to 60 percent of the total secondary extract drawn off, is recycled as autoclave extraction liquor in the next cycle. Alternatively to drawing off the entire secondary extract and recycling a portion of the draw-off, the first part of the draw-off can be recycled by collecting it in a separate tank and the second part of the draw-off can be set aside as a product stream. Similarly, the first portion of the secondary draw-off can be the product stream and the latter portion of the secondary draw-off can be recycled.

In all instances, it is important that the second autoclave extraction liquor be water and that sufficient water is used to wash coffee solids out of the spent stage extraction column so that a significant quantity of recycled soluble coffee solids will not be discarded with the spent roasted and ground coffee.

The fresh stage coffee extract may be combined directly with the secondary extract and the combined extracts dried to obtain coffee solids having a moisture content of from 1 to 4 percent by weight of the coffee solids. Alternatively, the secondary coffee extract can be concentrated, preferably to a solids content of 35 to 60 percent by weight of the extract, before it is combined with the fresh stage coffee extract.

A preferred treatment may be to separately dry the secondary and fresh stage coffee extracts and combine the dry powders. In this instance it may be preferred to freeze dry the fresh stage extract.

DESCRIPTION OF THE PREFERRED EMBODIMENT

In practicing split-extraction percolation a percolator set containing from 5 to 8 extraction columns is normally used. The extraction columns are connected by appropriate manifolding such that any column can receive the autoclave extraction liquor feed stream when it is in the spent stage position, or the atmospheric extraction liquor feed stream when it is the most spent stage of the atmospheric section of the percolator set. Similarly, each extraction column can be used as the fresh stage extraction column or the freshest stage of the autoclave section of the percolator set for taking an extract draw-off or as any other stage in the percolator set.

When practicing the process of this invention, the autoclave aqueous extraction liquor will normally be heated to about 300° F to 400° F before it is fed into the spent stage. The secondary extract will be drawn off at a temperature of about 250 to 360° F. and cooled to below 210° F. to prevent loss of aromatics.

In order to achieve a reasonable yield of soluble solids in the autoclave section, it is preferred to use a draw-off factor (D.O.F.) of about 3.0 to 5.0 and most preferably about 3.5 to 4.5. The D.O.F. is the ratio of extract drawn off to the weight of roasted and ground coffee charged into an extraction column.

The atmospheric extraction liquor will normally be heated to from 150° to 300° F. In all instances, the temperature of the extraction liquor entering the fresh stage must be controlled to insure a fresh stage extract draw-off temperature of 210° maximum. It is common practice to use a cooler prior to the fresh stage extraction column as a means of controlling the temperature of the fresh stage extraction liquor passing through the fresh stage extraction column. It may be preferred to keep the temperature of the atmospheric extraction liquor below 210° F. throughout the atmospheric section of the percolator set. The D.O.F. utilized in the atmospheric section may vary from about 0.5 to 5.0. A D.O.F. of about 1.0 to 3.5 is a preferred range When utilizing a percolator set containing six extraction columns, the atmospheric section of the percolator set may contain from 1 to 4 extraction columns. The autoclave section of this percolator set may contain from 2 to 5 extraction columns. A preferred arrangement is to use 3 extraction columns in each of the sections of the percolator set.

In practicing the process of this invention, from 40 to 60 percent of the secondary extract is preferably set aside and recycled as the first autoclave aqueous extraction liquor fed into the spent stage extraction column each cycle. While the exact percentage of secondary extract recycled is not fixed, it is important to allow for a sufficient flow of water as the second autoclave extraction liquor to insure that the soluble solids in the recycled extract will be flushed out of the extraction column before the roasted and ground coffee is discharged. Otherwise, a loss of yield would be experienced as a part of the extracted solids would be blown out of the extraction column along with the spent roasted and ground coffee. The recycled extract can be a portion of the entire secondary extract drawn off or the last portion of the secondary extract draw-off can be set aside as recycle. Preferably the secondary extract drawn off while the recycled extract is being fed into the spent stage extraction column is set aside as the recycle extract for the next extraction cycle. The second autoclave extraction liquor is preferably water and the secondary extract drawn-off when feeding the water into the spent stage extraction column represents a product stream.

In ordinary split-extraction percolation the solids content of the secondary extract may be as low as 5 to 8 percent by weight of the coffee extract. When practicing the process of this invention the solids concentration of the secondary extract may be increased to about 9 to 15 percent.

Both the secondary coffee extract and the fresh stage coffee extract will normally be dried to obtain a soluble coffee powder containing about 1 to 4 percent moisture by weight of the dry powder. The two extract streams can be combined prior to drying or dried separately. In the latter instance it may be preferable to freeze dry the fresh stage extract which contains the more flavorful and aromatic coffee constituents and spray-dry the secondary extract. It may be desirable to concentrate the secondary extract to a solids content of about 35 to 60 percent. The extract may be concentrated by known techniques such as evaporation, vacuum evaporation or freeze-concentration.

The process of this invention will be further described by the following examples:

EXAMPLE 1

A split extraction percolator set consisting of 5 extraction columns was utilized to extract roasted and ground coffee wherein 3 columns were used as the autoclave section and 2 columns were used as the atmospheric section.

In the atmospheric section of the percolator set, water at a temperature of 252° F. was used as the atmospheric extraction liquor. The water was passed through the 2 extraction columns and extract was drawn off from the fresh stage extraction column using a D.O.F. of 1.0. The solids concentration of the fresh stage extract was 11.9%. Water was also used at a temperature of 347° F. as the autoclave extraction liquor, and a secondary extract was drawn off using a D.O.F. of 3.5. The solids concentration of the secondary extract was 8.2%. The total yield (soluble solids in the extract as a percentage of the roasted and ground coffee charged into an extraction column) was 40.5%. The above conditions constituted a control run.

In the following run, the same conditions were used in the atmospheric section of the percolator set. The solids concentration in the fresh stage extract was 12.9% due to slightly higher temperatures of the fresh stage extraction liquor. Extraction in the autoclave section of the percolators was now set up according to the process of the instant invention. A total D.O.F. of 4.0 was used, and the first 50% of the secondary extract was recycled at a temperature of 340° F. as the first autoclave extraction liquor for the next cycle followed by water at a temperature of 340° F. as the second autoclave extraction liquor. The solids concentration of the second half of the secondary extract was 13.5% and the total yield was 39.8%. Operating conditions were purposely maintained to achieve approximately the same total yield. Note that the solids concentration of the secondary extract was almost 65% greater when practicing the process of this invention as compared to the control run.

Flavor analysis of the beverage prepared from the two runs showed that there was essentially no difference in the quality of the combined extract streams for the control run or the run utilizing the instant invention.

EXAMPLE 2

A control run and a run utilizing the process of this invention similar to those described in Example 1 were made on the same 5 extraction column percolator set. In these runs 3 extraction columns were used for the atmospheric section and 2 extraction columns in the autoclave section of the percolator set.

A D.O.F. of 1.0 was again used for the fresh stage extract drawn off, and the solids concentration of the fresh stage extract was 18.8% in both the control run and the run utilizing the process of this invention. In the control run, a D.O.F. of 3.5 was used when drawing off the secondary extract and the solids concentration of this extract was 5.2%. In the run using the process of this invention a total D.O.F. of 4.0 was used and the solids concentration in the second half of the secondary extract collected as product was 9.0% or about 72% greater than that for the control run.

The total yield in both runs was 36.8% and there was no significant difference in the flavor of the combined secondary and fresh stage extracts when prepared and tested at the same strength normally used in a cup of prepared coffee beverage.

Note that in both Examples 1 and 2 the amount of water to be removed when drying the extract was significantly reduced by practicing the process of this invention. In the second example the concentrations of the secondary extracts were lower than in Example 1 due to the use of only two extraction columns in the autoclave section of the percolator set.

The foregoing examples were for illustrative purposes and the scope of this invention is intended to be limited only by the appended claims.

What is claimed is:

1. A process for split-extraction percolation of roasted and ground coffee comprising extracting atmospherically soluble coffee solids from roasted and ground coffee in percolation columns constituting the atmospheric section of a split extraction percolation set by passing an atmospheric aqueous extraction liquor through the fresh section of the split-extraction percolation set and drawing off a predetermined weight of fresh stage coffee extract; further extracting the roasted and ground coffee in percolation columns constituting the autoclave section of the split-extraction percolation set by passing two autoclave aqueous extraction liquors successively through said autoclave section of the split-extraction percolation set and drawing off a secondary coffee extract; the initial autoclave aqueous extraction liquor being a recycled portion of the secondary coffee extract, the second autoclave aqueous extraction liquor being heated water, a predetermined weight of the secondary coffee extract being drawn off, a portion of the secondary extract being retained as product and a portion of the secondary extract being recycled as initial autoclave aqueous extraction liquor; combining said retained portion of secondary extract with said fresh stage coffee extract.

2. The process of claim 1 wherein from 40 to 60 percent of the total secondary coffee extract dawn off is recycled as the initial autoclave aqueous extraction liquor.

3. The process of claim 1 wherein the latter portion of the secondary extract drawn off is collected separately as the secondary extract to be recycled as an initial autoclave aqueous extraction liquor.

4. The process of claim 1 wherein the secondary coffee extract drawn off as product is concentrated to a solids content of from 35 to 60 percent solids by weight of the concentrated extract, the concentrated extract is combined with the fresh stage coffee extract and the combined extract is dried to obtain a dry coffee powder having a moisture content of from 1 to 4 percent by weight of the product.

5. The process of claim 1 wherein the secondary coffee extract drawn off as product and the fresh stage coffee extact are separately dried to obtain dry coffee powders having moisture contents of from 1 to 4 percent by weight of the powders and the dry powders are combined.

6. The process of claim 1 wherein the initial portion of the secondary extract drawn off is collected separately as the secondary extract to be recycled as an initial autoclave aqueous extraction liquor.

7. The process of claim 6 wherein the fresh stage coffee extract is freeze-dried and the secondary coffee extract is spray-dried.

References Cited
UNITED STATES PATENTS

| | | | |
|---|---|---|---|
| 2,949,364 | 8/1960 | Bilenker | 99—71 |
| 3,458,320 | 7/1969 | Niven, Jr. | 99—71 |
| 3,656,964 | 4/1972 | Mansky et al. | 99—71 |
| 3,655,399 | 4/1972 | Pitchon et al. | 99—71 |

FRANK W. LUTTER, Primary Examiner

W. L. MENTLIK, Assistant Examiner

U.S. Cl. X.R.

23—272.5; 426—432, 460